United States Patent [19]

Mena

[11] Patent Number: 4,762,444
[45] Date of Patent: Aug. 9, 1988

[54] SCREW TAP WITH LUBRICATION AND EXTRACTION BORES

[76] Inventor: Carl M. Mena, 58357 C.R.-111, Elkhart, Ind. 46517

[21] Appl. No.: 25,941

[22] Filed: Mar. 16, 1987

[51] Int. Cl.⁴ .......................... B23B 51/06; B23G 5/06
[52] U.S. Cl. .................................. 408/59; 10/141 R; 408/57; 408/222
[58] Field of Search ................. 10/141 R; 408/57, 59, 408/217, 218, 222

[56] References Cited

U.S. PATENT DOCUMENTS

| 83,371 | 10/1868 | Foster | 408/57 |
| 2,335,741 | 11/1943 | Contaldi | 408/222 |
| 4,651,374 | 3/1987 | Turchan | 408/222 X |

FOREIGN PATENT DOCUMENTS

| 645114 | 10/1928 | France | 408/201 |
| 40-1748 | 1/1965 | Japan | 10/141 R |

Primary Examiner—Gil Weidenfeld
Assistant Examiner—Steven C. Bishop
Attorney, Agent, or Firm—Finnegan, Henderson, Farabow, Garrett & Dunner

[57] ABSTRACT

A tap for forming threads on the inside of a bore which includes a hexagonal central pilot bore and transverse dihedral shafts constituting means for extracting a tap broken within a bore and also constituting means for depositing lubrication or coolant or introducing pressurized air to the cutting dies of the tap. Slots are formed in the distal end of the tap to allow a flat bladed instrument to be inserted for removal of a broken tap part.

10 Claims, 1 Drawing Sheet

U.S. Patent    Aug. 9, 1988    4,762,444
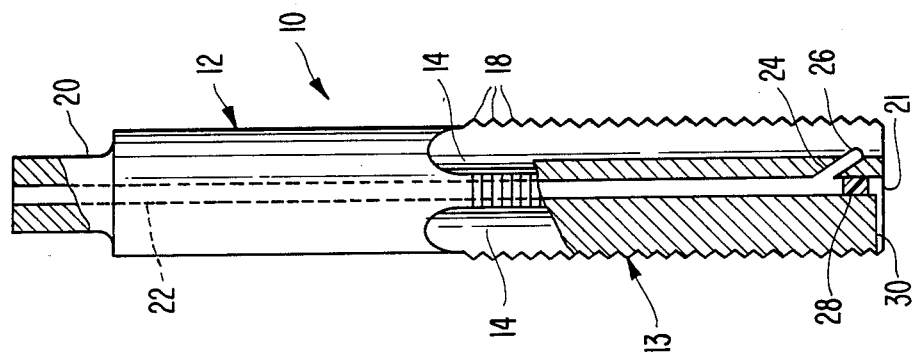
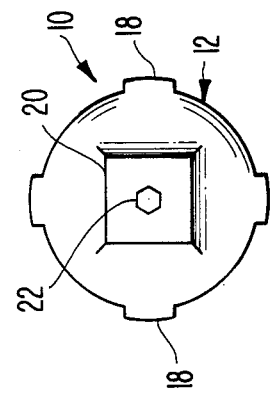
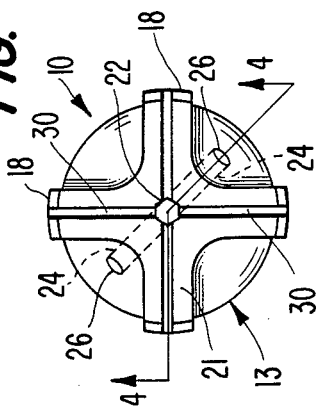
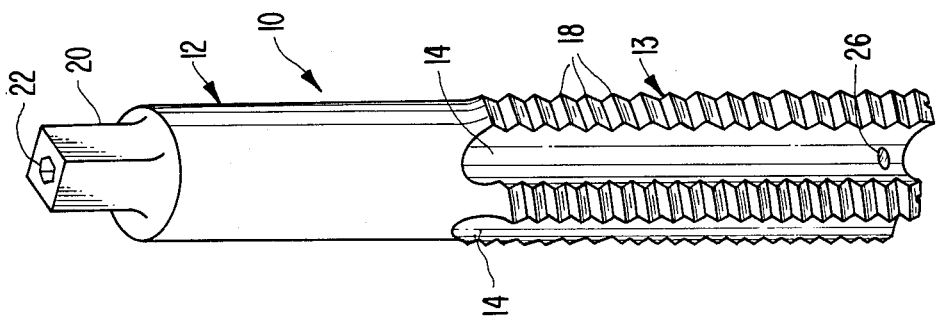

SCREW TAP WITH LUBRICATION AND EXTRACTION BORES

SUMMARY OF THE INVENTION

This invention relates to an improved tap structure, more particularly one having a longitudinal bore and transverse bores extending outwardly therefrom to carry lubricant to the cutting edges, the longitudinal bore so designed as to facilitate removal of the tap in the event that it is broken during the cutting operation.

Heretofore, taps used for cutting internal threads in bores were formed with a generally solid shank having a threaded portion with flutes and a squared end for attachment to a means for turning the tap. One problem associated with using a solid shank portion is extraction of a broken tap from a bore. To extract a broken solid tap, the user must drill some type of pilot hole and insert an extraction tool to turn the tap out. Another problem associated with such taps is that lubrication and cooling of the tap is inefficient, which causes the tap to become dull faster.

The tap of this invention eliminates the above problems by providing a noncircular, preferably hexagonal, central bore extending the length of the tap and having transverse dihedral bores terminating in the flutes near the distal end of the tap.

The central bore serves the additional purpose of strengthening the tap. In a standard tap, without a bore, the stress is undirectionally applied and is one of the primary reasons for fracture of the tap due to stress concentration. The axial bore acts to distribute the stress around the complete internal peripheral diameter of the tap. Thereby, eliminating stress concentration which is a prime cause of tap fracture. To remove a broken tap, an Allen wrench may be inserted into the central bore of the tap to extract a broken tap part from a bore. A lubricant, coolant or pressurized air may be introduced in the central bore which is subsequently ducted to the flutes and external threads by the transverse dihedral bores.

Accordingly, it is an object of this invention to provide a tap with a central bore to allow easier removal of a broken tap part.

Another object of this invention is to provide a screw tap having transverse shafts through which lubrication coolant or pressured air is applied and which provide for cooling of the tap and chip removal during use, thereby increasing the useful life of the tap.

Further objects of this invention will become apparent upon a reading of the following description.

BRIEF DESCRIPTION OF THE DRAWINGS

FIG. 1 is a perspective view of the screw tap of this invention.

FIG. 2 is a top view of the tap of this invention.

FIG. 3 is a bottom view of the tap of this invention.

FIG. 4 is a fragmentary sectional view taken along line 4—4 of FIG. 3.

DESCRIPTION OF THE PREFERRED EMBODIMENT

The preferred embodiment illustrated is not intended to be exhaustive or to limit the invention to the precise form disclosed. It is chosen and described in order to best explain the principles of the invention, its application and practical use to thereby enable others skilled in the art to best utilize the invention.

For purposes of illustration, a serial or bottoming tap is depicted and this in no way is intended as a limitation on the invention, which may be incorporated into a taper, plug or any other style or type of tap.

Tap 10 as shown in the figures includes a shank end 12 and a threaded end 13 which has a plurality of flutes 14 which form a space for metal chips which are removed during the tapping process. External threads 18 are formed in the outer edge of threaded end 13 to contact and cut threads onto the bore inner side walls (not shown). In the illustration, shank 12 has a common squared end 20 which is adapted for turning by hand with an ordinary wrench but which may be adapted for connection to any number of different means or devices for rotating tap 10 downwardly into a bore.

A noncircular bore 22 which is preferably hexagonal is formed through the central axis of tap 10. Extending therefrom are transverse dihedral bores 24 to establish communication with flutes 14 at openings 26. A plug 28 is shown in the figures positioned in bore 22 near face 21 of fluted end 13 below the junction of bore 22 and transverse dihedral bores 24. Plug 28 is formed from a resilient material and is included to prevent lubricant from merely passing through the tap bore and causes it to flow through transverse dihedral bores 24. If a blind bore is being tapped, plug 28 may be removed, and the lubricant would merely enter the bore directly through central bore 22.

Extraction slots 30 are cut into bottom face 21 of threaded end 13 at substantially right angles to allow for a flat bladed instrument to access slots 30 for removal of a broken tap part.

In use, tap 10 is inserted into a bore and a turning device is applied to end 20. Tap 10 is rotated and progresses further into the bore as external threads 18 cut threads into the side walls of the bore. Axial bore 22 is included in tap 10 to strengthen the tap by distributing stress evenly around the internal periphery of bore 22. Furthermore, lubricant or coolant may be inserted into central bore 22 which, in conjunction with dihedral bores 24 and openings 26, directs the lubricant to external threads 18 thereby reducing friction between the threads and the bore's inner side walls. Pressurized air may be introduced into bore 22 to blow chips formed in tapping away from threads 18. Lubricating threads 18 reduces friction substantially thereby providing for easier tapping and reduced dulling effect of the groove.

If tap 10 breaks within a bore during a tapping operation, an Allen wrench or other type of hexagonal tool may be inserted into bore 22 to remove the remaining tap part. As stated previously, because Allen wrenches are commercially and readily available, the hexagonal shape is preferred. It will be understood that bore 22 may be of any cross-sectional shape other than circular, and an appropriate complementary tool can be used to turn and extract a broken tap part. A flat bladed tool such as a screwdriver may be inserted into slots 30 on face 21 to remove fluted end 13 of tap 10 in the event of a tap breaking within a bore. Since there will be access to one end or the other of a broken tap, hexagonal bore 22 and extraction slots 30 allow for the easy removal of a broken tap part without requiring the drilling of additional pilot holes.

I claim:

1. A tap for forming internal threads on the inner wall of a bore, said tap including a longitudinally extending shank portion and an external threaded portion, said threaded portion being interrupted by at least one but less than six longitudinally extending flutes, said threaded portion terminating in a distal end, and a longitudinal cavity in the tap, said longitudinal cavity having an hexagonal cross-section and constituting means for rotating said tap by a mating tool having an hexagonal cross-section.

2. The tap of claim 1 including at least one radial cavity extending between said longitudinal cavity and flute for introducing a liquid through the tap to the threaded portion to contact said inner bore wall.

3. The tap of claim 2 wherein said radial cavity extends from said longitudinal cavity at an acute angle and terminates in said flute near said distal end.

4. The tap of claim 2 wherein said longitudinal cavity extends to said distal end, and a plug is fitted within said longitudinal cavity between said distal end and said radial cavity.

5. The tap of claim 1 wherein said longitudinal cavity extends through said shank and threaded portions.

6. The tap of claim 1 including transverse slots in said distal end for accommodating a bladed extraction tool for axial rotation of said tap.

7. The tap of claim 1 wherein the longitudinal cavity extends through the entire length of the tap.

8. The tap of claim 1 wherein the longitudinal cavity extends from said distal end into said threaded portion.

9. The tap of claim 1 wherein the number of longitudinally extending flutes is four.

10. A tap for forming internal threads on the inner wall of a bore, said tap including a longitudinally extending shank portion and an external threaded portion, said threaded portion being interrupted by at least one longitudinally extending flute, said threaded portion terminating in a distal end, and a longitudinal cavity in the tap, said longitudinal cavity having a polygonal cross-section and constituting means for rotating said tap with a mating tool, the polygonal cross-section having a number of sides greater than the number of longitudinal flutes.

* * * * *